United States Patent
Bhaggan et al.

(10) Patent No.: US 11,421,183 B2
(45) Date of Patent: Aug. 23, 2022

(54) PROCESS FOR REFINING VEGETABLE OIL WITH SUPPRESSION OF UNWANTED IMPURITIES

(71) Applicant: Bunge Loders Croklaan B.V., Wormerveer (NL)

(72) Inventors: Krishnadath Bhaggan, Wormerveer (NL); Erik Johan Anton Schweitzer, Wormerveer (NL); Jeanine Luvelle Werleman, Wormerveer (NL)

(73) Assignee: Bunge Loders Croklaan B.V., Wormerveer (NL)

( * ) Notice: Subject to any disclaimer, the term of this patent is extended or adjusted under 35 U.S.C. 154(b) by 0 days.

(21) Appl. No.: 16/639,419

(22) PCT Filed: Aug. 22, 2018

(86) PCT No.: PCT/EP2018/072653
§ 371 (c)(1),
(2) Date: Feb. 14, 2020

(87) PCT Pub. No.: WO2019/038320
PCT Pub. Date: Feb. 28, 2019

(65) Prior Publication Data
US 2021/0363459 A1 Nov. 25, 2021

(30) Foreign Application Priority Data
Aug. 23, 2017 (EP) .................................. 17275126

(51) Int. Cl.
| | |
|---|---|
| C11B 3/00 | (2006.01) |
| A23L 33/115 | (2016.01) |
| C11B 3/04 | (2006.01) |
| C11B 3/06 | (2006.01) |
| C11B 3/14 | (2006.01) |
| C11B 3/10 | (2006.01) |

(52) U.S. Cl.
CPC ............. *C11B 3/001* (2013.01); *A23L 33/115* (2016.08); *C11B 3/04* (2013.01); *C11B 3/06* (2013.01); *C11B 3/10* (2013.01); *C11B 3/14* (2013.01); *A23V 2002/00* (2013.01)

(58) Field of Classification Search
CPC ..... C11B 3/04; C11B 3/06; C11B 3/10; C11B 3/14; C11B 3/006; C11B 3/001; A23L 33/115
See application file for complete search history.

(56) References Cited

U.S. PATENT DOCUMENTS

| | | | |
|---|---|---|---|
| 2015/0166930 A1 | 6/2015 | Hed et al. | |
| 2016/0227809 A1 | 8/2016 | Mellerup | |

FOREIGN PATENT DOCUMENTS

| | | | | |
|---|---|---|---|---|
| EP | 3321348 A1 | * | 5/2018 | ............. C11B 3/006 |
| WO | 2010/063450 A1 | | 6/2010 | |
| WO | WO-2010063450 A1 | * | 6/2010 | ............... C11B 3/00 |
| WO | 2011/069028 A1 | | 6/2011 | |
| WO | WO-2011069028 A1 | * | 6/2011 | ............... C11C 3/10 |
| WO | 2012/065790 A1 | | 5/2012 | |
| WO | WO-2012065790 A1 | * | 5/2012 | ............. C11B 3/001 |
| WO | 2012/107320 A1 | | 8/2012 | |
| WO | WO-2012107230 A1 | * | 8/2012 | ............. C11B 3/001 |
| WO | 2013/093093 A1 | | 6/2013 | |
| WO | 2014/012548 A1 | | 1/2014 | |
| WO | WO-2014012548 A1 | * | 1/2014 | ............... C11B 3/00 |
| WO | 2014/081279 A1 | | 5/2014 | |
| WO | 2015/057139 A1 | | 4/2015 | |
| WO | 2015/174820 A1 | | 11/2015 | |

OTHER PUBLICATIONS

Zelinkova et al., "Fatty acid esters of 3-chloropropane-1,2-diol in edible oils," Food Additives and Contaminants, 23: 1290-1298 (2006).
Gibon et al., "Palm oil refining," European Journal of Lipid Science and Technology, 109: 315-335 (2007).
TONSIL® Supreme 118 FF Technical Data sheet, Sud-Chemie.
Program Symposium: "MCPD- und Glycidyl-Ester" (Jun. 2017).
Frank Pudel "Where are we with the mitigation of 2 and 3-MCPD Esters and Glycidyl esters?" Pilot Pflanzenoltechnologie Magdeburg e.V. (2017).
Birgit Christall "Toolbox for the Mitigation of 3-MCPD Esters and GlycidylEsters in Food," DGF-Symposium on MCPD Esters and GlycidylEsters (2017).
Toolbox for the Mitigation of 3-MCPD Esters and Glycidyl Esters in Food, Bund für Lebensmittelrech und Lebensmittelheilkunde e.V. (BLL) (2016).
FEDIOL Review of Mitigation Mesarues MCPD Esters and glycidyl esters in food (2015).

(Continued)

*Primary Examiner* — Yate' K Cutliff
(74) *Attorney, Agent, or Firm* — Morgan, Lewis & Bockius LLP

(57) ABSTRACT

Process for refining vegetable oil, to suppress the formation of monochloropropanediol esters (MCPDe) and reduce the content of glycidyl esters, comprising first and second refinement stages, wherein the first refinement stage comprises: a) providing a crude vegetable oil having a combined MCPDe and glycidyl ester content below 0.2 ppm; b) degumming the crude vegetable oil to produced degummed vegetable oil; c) bleaching of the degummed vegetable oil with activated bleaching earth under reduced pressure to yield bleached vegetable oil; d) adding a base to the bleached vegetable oil and subsequent stripping and deodorizing under reduced pressure at a temperature below 255° C. to yield an intermediate refined vegetable oil; and a second refinement stage comprising the steps of: e) bleaching of the intermediate refined vegetable oil using activated bleaching earth under reduced pressure to yield a bleached vegetable oil; and f) deodorizing at a temperature below 220° C. to yield fully refined vegetable oil, wherein the fully refined vegetable oil has a combined MCPDe and glycidyl ester content below 4 ppm.

15 Claims, No Drawings

(56) References Cited

OTHER PUBLICATIONS

Cheng et al., "Glycidyl Fatly Acid Esters in Refined Edible Oils: A Review on Formation, Occurrence, Analysis, and Elimination Methods," Comprehensive Reviews in Food Science and Food Safety, 16: 263-281 (2017).
International Search Report issued in corresponding International Patent Application No. PCT/EP2018/072653 dated Sep. 12, 2018.
Written Opinion issued in corresponding International Patent Application No. PCT/EP2018/072653 dated Sep. 12, 2018.

* cited by examiner

PROCESS FOR REFINING VEGETABLE OIL WITH SUPPRESSION OF UNWANTED IMPURITIES

This invention relates to a process for refining vegetable oil, in particular to suppress the formation of monochloropropanediol esters (MCPDe) and reduce the content of glycidyl esters.

It is known that 3-chloro-1,2-propanediol (3-MCPD) and 2-chloro-1,3-propanediol (2-MCPD), and derivatives of these compounds such as esters, can be formed in processed fats and oils. The compounds may be found as esters of fatty acids in some triglyceride fats. Glycidol (2,3-epoxy-1-propanol) and fatty acid esters thereof may also be present in refined triglyceride fats and oils.

2-MCPD, 3-MCPD and glycidol compounds are undesirable in processed fats and oils due to potential hazards related to their intake when used in foodstuffs.

US 2016/227809 relates to a process for the mitigation of 2-MCPD, 3-MCPD, esters thereof and glycidyl esters in a vegetable oil comprising the steps of a) subjecting the vegetable oil to one or more refining steps and b) subjecting the refined vegetable oil from step a) to a vacuum distillation at about 200-280° C. and at pressure of about 0.0001-3.0 mbar.

WO 2012/065790 discloses a method of producing a refined, bleached and deodorised vegetable oil which comprises degumming a vegetable oil, bleaching the degummed oil and deodorising the bleached oil, wherein the degumming, bleaching and deodorising conditions are selected to reduce the content of 3-MCPD and esters thereof in the deodorised oil to less than 8 ppm.

WO 2013/093093 describes a method of removing glycidyl esters from a vegetable oil which comprises contacting the oil with at least 0.5% by weight of the oil of an acid-activated bleaching earth and deodorising the oil at a temperature of less than 200° C. for a time of at least 30 minutes.

WO 2014/012548 describes a process for lowering the amount of esters of 2- and 3-MCPD in refined triglyceride oil, comprising the steps of: blending the oil with a base; and heat treating the oil while passing steam through the oil at reduced pressure, keeping the degree of interesterification in the product from the process below 60%.

There remains a need for a process for refining vegetable oils which can achieve low levels of MCPDe and glycidyl esters in the refined oil, and yet is generally compatible with conventional refining processes with a minimum of process modification.

According to the invention, there is provided a process for refining vegetable oil, in particular to suppress the formation of monochloropropanediol esters (MCPDe) and reduce the content of glycidyl esters, comprising first and second refinement stages, wherein the first refinement stage comprises the steps of:

a) providing a crude vegetable oil having a combined MCPDe and glycidyl ester content below 0.2 ppm, preferably below 0.1 ppm;

b) degumming the crude vegetable oil to produced degummed vegetable oil;

c) bleaching of the degummed vegetable oil with activated bleaching earth under reduced pressure to yield bleached vegetable oil, preferably at a reduced pressure of 80-800 mbar;

d) adding a base to the bleached vegetable oil and subsequent stripping and deodorizing under reduced pressure at a temperature below 255° C. to yield an intermediate refined vegetable oil;

and subsequently a second refinement stage comprising the steps of:

e) bleaching of the intermediate refined vegetable oil using activated bleaching earth under reduced pressure to yield a bleached vegetable oil, preferably at a reduced pressure of 80-800 mbar; and f) deodorizing at a temperature below 220° C. to yield fully refined vegetable oil, preferably at a reduced pressure below 5 mbar;

wherein the fully refined vegetable oil has a combined MCPDe and glycidyl ester content below 4 ppm.

Also provided by the invention in another aspect is the use of an oil or fat obtained using the process of the invention for the preparation of a food product.

Further provided by the invention is a food product containing an oil or fat produced using a process according to the invention.

It has been found that a two-stage process can be used to lower the content of MCPDe and glycidyl esters by suppressing the formation of MCPDe and removing glycidyl esters.

The combination of steps allows the overall levels of MCPDe and glycidyl esters in the refined vegetable oil to be reduced to surprisingly low levels.

The term MCPDe refers to esters of MCPD and includes esters of 2-MCPD and 3-MCPD. The esters will typically be esters of the MCPD compounds with fatty acids.

Glycidyl esters are also typically present as esters of fatty acids.

As will be appreciated by those skilled in the art, analytical methods used for determining MCPDe and glycidyl esters may also detect free MCPD and free glycidol as being part of the content of ester compounds. However, the free compounds are typically present in the oils at very low levels. For the purposes of this invention, the amounts of MCPDe and glycidyl esters include any free MCPD compounds and free glycidol, respectively, that may be present in the oils.

The term "fatty acid", as used herein, refers to straight chain saturated or unsaturated (including mono- and poly-unsaturated) carboxylic acids having from 6 to 24 carbon atoms (C6 to C24).

MCPDe and glycidyl ester content may be determined using the technique described by Zwagerman et al in "A Novel method for the automatic sample preparation and analysis of 3-MCPD-, 2-MCPD-, and glycidylesters in edible oils and fats", *Eur J Lipid Sci Technol*, 2015, 117. The method is based on AOCS Cd 29c-13.

The terms "oil" and "fat" are sometimes used interchangeably herein and are not intended to imply any particular physical form or melting point.

In the present invention, the suppression of the formation of MCPDe and reduction in the content of glycidyl esters means that the vegetable oil has a combined MCPDe and glycidyl ester content below 4 ppm, preferably below 2 ppm, more preferably below 1.75 ppm, such as below 1.5 ppm, even more preferably below 1 ppm. Typically, the combined MCPDe and glycidyl ester content is in the range of from 0.5 to 2 ppm, such as from 1 ppm to 2 ppm.

The crude vegetable oil that is used in the process of the invention may be any vegetable oil. Vegetable oils predominantly contain triglycerides, typically in an amount of greater than 75% by weight, more usually greater than 85% by weight. Suitable oils include palm oil, palm kernel oil, cocoa butter, cocoa butter substitutes, illipe fat, shea fat, canola oil, castor oil, coconut oil, coriander oil, corn oil, cottonseed oil, hazelnut oil, hempseed oil, linseed oil, mango kernel oil, olive oil, peanut oil, rapeseed oil, rice bran oil, safflower oil, soybean oil, and sunflower oil, and mixtures thereof. Preferably, the oil comprises or consists of crude palm oil.

The crude vegetable oils used in the process of the invention typically have low levels of MCPDe and glycidyl esters in their naturally occurring form.

Preferably, the fully refined vegetable oil produced by the process of the invention has a combined MCPDe and glycidyl ester content of below 2 ppm, preferably below 1.75 ppm, such as below 1.5 ppm or below 1 ppm. Typically, the combined MCPDe and glycidyl ester content will be above 0.01 ppm or above 0.1 ppm, such as above 0.5 ppm or above 1 ppm. Thus, the combined MCPDe and glycidyl ester content may range from 0.01 to 4 ppm, more preferably from 0.1 to 2 ppm, such as from 0.5 to 1.5 ppm.

The combined MCPDe and glycidyl ester content in the fully refined vegetable oil preferably comprises: less than 0.75 ppm more preferably less than 0.5 ppm 2-MCPDe; less than 1 ppm more preferably less than 0.75 ppm 3-MCPDe; and less than 0.5 ppm glycidyl esters.

Preferably, the fully refined vegetable oil has a combined 2-MCPDe and 3-MCPDe content of below 2 ppm, more preferably below 1.5 ppm.

The fully refined vegetable oil preferably has a glycidyl ester content of below 2 ppm, more preferably below 1 ppm, such as below 0.5 ppm. The low level of glycidyl esters that can be achieved is a particularly surprising effect of the invention.

Preferably, the degumming step b) is water degumming, or an acid degumming step using a non-chloride-containing acid, more preferably phosphoric acid, citric acid or malic acid or mixtures thereof. It is particularly preferred to use phosphoric acid in an amount of from 0.01 to 0.1% by weight based on the weight of the oil. Typically, degumming is carried out at an elevated temperature of from 80 to 110° C.

The amount of bleaching earth used in bleaching step c) is typically from 0.5 to 3% by weight of the oil. Bleaching is carried out at a reduced pressure for a suitable time, such as from 30 minutes to 2 hours.

Bleaching earths may be used singly or as mixtures of two or more bleaching earths. Activated bleaching earths can be acid and/or physically activated (e.g., by thermal treatment). Activation means that the surface area is increased in order to improve the bleaching efficiency.

Bleaching earths include hydrous clays containing one or more of Si, Al, Ca and Mg. Examples of bleaching earths include:

Montmorillonite $(Na,Ca)_{0.3}(Al,Mg)_2Si_4O_{10}(OH)_2 \cdot nH_2O$;
Palygorskite $(Mg,Al)_2Si_4O_{10}(OH) \cdot nH_2O$;
Sepiolite $Mg_4Si_6O_{15}(OH)_2 \cdot nH_2O$;
Muscovite $(KAl_2(Si_3Al)O_{10}(OH)_2$;
Sanidine $(K, Na)(SiAl)_4O_8$;
Quartz $(SiO_2)$;
Calcite $(CaCO_3)$;
and mixtures thereof.

Preferably, the base in step d) is selected from the group consisting of sodium methoxide, sodium hydroxide, potassium hydroxide, sodium carbonate, sodium bicarbonate, potassium carbonate, potassium bicarbonate, sodium salts of fatty acids, potassium salts of fatty acids, calcium salts of fatty acids, and mixtures thereof. The amount of base is preferably between 10 and 50 ppm based on the weight of the oil, more preferably between 15 and 25 ppm. The most preferred base is potassium hydroxide.

The temperature in step d) is preferably from 210 to 255° C., more preferably from 230 to 250° C. The deodorization in step d) is preferably carried out at a reduced pressure of less than 10 mbar, more preferably less than 5 mbar, even more preferably less than 2 mbar. Step d) is typically carried out for a time of from 1 to 3 hours.

Preferably, the stripping in step d) is performed using steam. Methods for steam stripping vegetable oils are known to the skilled person and are disclosed in, for example, EP-A-2502503.

An intermediate refined vegetable oil is produced by the part of the process that comprises steps a) to d). The intermediate refined vegetable oil is subjected to a second refinement stage comprising steps e) and f).

The bleaching of the intermediate refined vegetable oil in step e) is preferably carried out using from 0.1 to 2% by weight of activated bleaching earth. Again, the bleaching earth may be a single bleaching earth or a mixture of two or more bleaching earths. Activated bleaching earths can be acid and/or physically activated. The process is typically carried out for 10 minutes to 2 hours at a temperature of from 70 to 140° C. Most preferably, the bleaching in step e) is carried out at a temperature between 80 and 130° C., in the presence of 0.3-0.8% by weight of bleaching earth, preferably for a time of 0.3 to 1 hours.

Preferably, the deodorisation in step f) is carried out at a temperature of below 220° C. (or below 200° C.), such as from 150 to 210° C., and more preferably between 150 and 180° C. to yield the fully refined vegetable oil. Preferably, the reduced pressure is below 4 mbar, such as from 0.5 to 3 mbar. Step f) may be carried out batchwise, typically for 1 to 5 hours, or continuously.

Also provided by the invention is a process for refining crude palm oil, comprising first and second refinement stages, wherein the first refinement stage comprises the steps of:
a) providing a crude palm oil having a combined MCPDe and glycidyl ester content below 0.2 ppm;
b) degumming the crude vegetable oil to produced degummed vegetable oil;
c) bleaching of the degummed vegetable oil with activated bleaching earth under reduced pressure of 80-800 mbar to yield bleached vegetable oil;
d) adding from 10 to 50 ppm of an alkali metal hydroxide to the bleached vegetable oil and subsequent stripping and deodorizing under reduced pressure at a temperature below 255° C. to yield an intermediate refined palm oil;
and subsequently a second refinement stage comprising the steps of:
e) bleaching of the intermediate refined palm oil using activated bleaching earth under reduced pressure of 80-800 mbar to yield a bleached vegetable oil; and
f) deodorizing at a temperature below 220° C. to yield fully refined vegetable oil, at a reduced pressure below 5 mbar,
wherein the fully refined vegetable oil has a combined MCPDe and glycidyl ester content below 2 ppm, and preferably a glycidyl ester content of below 1 ppm.

The fully refined vegetable oil that is produced in the process of the invention may be used in a food product. Examples of food products in which the fully refined vegetable oil may be used, either alone or in combination with one or more other vegetable oils, include spreads, margarine, cream alternatives, infant food, chocolate, confectionery, bakery products, sauces, ice-creams, ice-cream coatings, cheese, soups, mayonnaise and dressings, and other food products comprising a fat phase.

The listing or discussion of an apparently prior-published document in this specification should not necessarily be taken as an acknowledgement that the document is part of the state of the art or is common general knowledge.

Preferences and options for a given aspect, embodiment, feature or parameter of the invention should, unless the context indicates otherwise, be regarded as having been disclosed in combination with any and all preferences and options for all other aspects, embodiments, features and parameters of the invention.

The following non-limiting examples illustrate the invention and do not limit its scope in any way. In the examples and throughout this specification, all percentages, parts and ratios are by weight unless indicated otherwise.

EXAMPLES

Throughout the examples, 3-MCPD-, 2-MCPD-, and glycidylesters are determined by the method described in Zwagerman et al, *Eur J Lipid Sci Technol*, 2015, 117.

Example 1 (Comparative, Standard Process—1-Step)

978 gram of crude palm oil (PO) was degummed and bleached at 90° C. with 0.05% of $H_3PO_4$ (50% sol) and 1.2% (wt) bleaching earth (blend of Ashapura V2 (acid-activated)/PureFlo B80 (thermally activated)) for 25 minutes at 700 mbar and 20 minutes at 100 mbar. After filtration, the bleached PO was deodorized for 60 minutes at 245° C. followed by 90 minutes at 240° C. and a pressure of about 2 mbar. After this the oil was cooled down and a sample (RBD PO) was submitted for MCPDe and GE analysis.

The results are shown in the table below:

|  | 3-MCPDe (ppm) | 2-MCPDe (ppm) | Glycidyl ester (ppm) |
| --- | --- | --- | --- |
| Crude palm oil | <0.10 | <0.10 | <0.10 |
| Fully refined PO | 3.41 | 2.51 | 1.48 |

Example 2 (2-Step Process)

1004 gram of crude palm oil (PO) was degummed and bleached at 90° C. with 0.05% of $H_3PO_4$ (50% sol) and 1.5% (wt) bleaching earth (blend of Ashapura V2/PureFlo B80) for 25 minutes at 700 mbar and 20 minutes at 100 mbar. After filtration, 35 ppm potassium hydroxide (KOH) was added to the bleached PO and deodorized for 60 minutes at 245° C. followed by 90 minutes at 240° C. and a pressure of about 1 mbar. After this the oil was cooled down and a sample (RBD PO) was submitted for MCPDe and GE analysis.

The obtained RBD PO from step 1 was bleached again (process step 2) with 0.5% bleaching earth (Tonsil ex 1707 VIII (acid-activated)) at 90° C. for 25 minutes at 700 mbar and 20 minutes at 100 mbar without addition of any acid. After filtering off the bleaching earth, bleached RBD PO was deodorized at 200° C. for 3 hours and a pressure of about 1 mbar. After this the oil was cooled down and a sample (fully refined PO) was analyzed on MCPDe and glycidyl esters.

The results are shown in the table below:

|  | 3-MCPDe (ppm) | 2-MCPDe (ppm) | Glycidyl ester (ppm) |
| --- | --- | --- | --- |
| Crude palm oil | <0.10 | <0.10 | 0.13 |
| RBD PO | 0.74 | 0.50 | 3.78 |
| Fully refined PO | 0.77 | 0.50 | 0.23 |

Example 3 (2-Step Process)

977 gram of crude palm oil (PO) was degummed and bleached at 90° C. with 0.05% of $H_3PO_4$ (50% sol) and 1.5% (wt) bleaching earth (blend of Ashapura V2/PureFlo B80) for 25 minutes at 700 mbar and 20 minutes at 100 mbar. After filtration, 16 ppm potassium hydroxide (KOH) was added to the bleached PO and deodorized for 60 minutes at 245° C. followed by 90 minutes at 240° C. and a pressure of about 1 mbar. After this the oil was cooled down and a sample (RBD PO) was submitted for MCPDe and GE analysis.

The obtained RBD PO from step 1 was bleached again (process step 2) with 0.5% bleaching earth (Tonsil ex 1707 VIII) at 90° C. for 25 minutes at 700 mbar and 20 minutes at 100 mbar without addition of any acid. After filtering off the bleaching earth, bleached RBD PO was deodorized at 200° C. for 3 hours. After this the oil was cooled down and a sample (fully refined PO) was analyzed on MCPDe and glycidyl esters.

The results are shown in the table below:

|  | 3-MCPDe (ppm) | 2-MCPDe (ppm) | Glycidyl ester (ppm) |
| --- | --- | --- | --- |
| Crude palm oil | <0.10 | <0.10 | 0.13 |
| RBD PO | 0.42 | 0.31 | 3.88 |
| Fully refined PO | 0.50 | 0.35 | 0.22 |

Example 4 (Up-Scaling)

In a continuous refining process, crude palm oil (cPO) is refined with a throughput of 50-80 metric tonnes/hour. The cPO is degummed by adding about 0.05% by weight phosphoric acid and mixing by means of a high shear mixer at 95° C. After degumming, the product is bleached according to a two step bleaching process with 1.5-2% by weight of activated bleaching earth (blend of Ashapura V2/Sepigel N200RF (physically activated)) for 2 hours at a pressure of 80-340 mbar. After bleaching, 18-22 ppm of KOH is added and the oil is steam stripped/deodorized for 2 hours at 235-240° C. and a pressure of about 2 mbar.

RBD palm oil from the previous step is refined once more to obtain fully refined PO, by bleaching with 0.5-1% by weight of activated bleaching earth (blend of Ashapura V2/Sepigel N200RF) for 2 hours at a pressure of 80-340 mbar. After bleaching, the oil is deodorized at 200° C. and a pressure of about 2 mbar at a throughput of 30-60 metric tonnes/hour.

Typical results of mitigated samples are shown in the table below:

|  | 3-MCPDe (ppm) | 2-MCPDe (ppm) | Glycidyl ester (ppm) |
| --- | --- | --- | --- |
| Crude palm oil | <0.10 | <0.10 | <0.10 |
| RBD PO | 0.73 | 0.40 | 5.50 |
| Fully refined PO | 0.87 | 0.44 | 0.20 |

Example 5 (Effect of KOH Dosing)

Example 2 was repeated, but different amounts of potassium hydroxide were added. The results for the RBD and fully refined PO are shown in the table below:

|  | 3-MCPDe (ppm) | 2-MCPDe (ppm) | Glycidyl ester (ppm) |
| --- | --- | --- | --- |
| Crude palm oil | <0.10 | <0.10 | <0.10 |
| Amount of KOH | | | |
| RBD PO - 4 ppm | 2.24 | 1.10 | 1.23 |
| Fully refined PO - 4 ppm | 2.21 | 1.44 | 0.70 |
| RBD PO - 10 ppm | 0.64 | 0.38 | 0.99 |
| Fully refined PO - 10 ppm | 0.48 | 0.31 | 0.59 |
| RBD PO - 16 ppm | 0.42 | 0.31 | 3.88 |
| Fully refined PO - 16 ppm | 0.50 | 0.35 | 0.22 |
| RBD PO - 20 ppm | 0.42 | 0.31 | 3.88 |
| Fully refined PO - 20 ppm | 0.50 | 0.35 | 0.22 |
| RBD PO - 45 ppm | 0.74 | 0.50 | 3.78 |
| Fully refined PO - 45 ppm | 0.77 | 0.50 | 0.23 |

The invention claimed is:

1. A process for refining vegetable oil, to suppress the formation of monochloropropanediol esters (MCPDe) and reduce the content of glycidyl esters, comprising first and second refinement stages,
wherein the first refinement stage comprises:
   a) providing a crude vegetable oil having a combined MCPDe and glycidyl ester content below 0.2 ppm;
   b) degumming the crude vegetable oil to produce degummed vegetable oil;
   c) bleaching of the degummed vegetable oil with activated bleaching earth under reduced pressure to yield bleached vegetable oil;
   d) adding a base to the bleached vegetable oil and subsequent stripping and deodorizing under reduced pressure at a temperature below 255° C. to yield an intermediate refined vegetable oil; and
wherein the second refinement stage subsequently comprises:
   e) bleaching of the intermediate refined vegetable oil using activated bleaching earth under reduced pressure to yield a bleached vegetable oil; and
   f) deodorizing at a temperature below 220° C. to yield fully refined vegetable oil, wherein the fully refined vegetable oil has a combined MCPDe and glycidyl ester content below 4 ppm.

2. The process according to claim 1, wherein the fully refined vegetable oil has a combined MCPDe and glycidyl ester content below 2 ppm.

3. The process according to claim 1, wherein the combined MCPDe and glycidyl ester content comprises less than 0.5 ppm 2-MCPDe, less than 1 ppm 3-MCPDe and less than 0.5 ppm glycidyl esters.

4. The process according to claim 1, wherein the fully refined vegetable oil has a combined 2-MCPDe and 3-MCPDe content of below 2 ppm.

5. The process according to claim 1, wherein the fully refined vegetable oil has a glycidyl ester content of below 2 ppm.

6. The process according to claim 1, wherein the degumming step b) is water degumming, or an acid degumming step using a non-chloride-containing acid.

7. The process according to claim 1, wherein the base in step d) is selected from the group consisting of sodium methoxide, sodium hydroxide, potassium hydroxide, sodium carbonate, sodium bicarbonate, potassium carbonate, potassium bicarbonate, sodium salts of fatty acids, potassium salts of fatty acids, calcium salts of fatty acids, and mixtures thereof.

8. The process according to claim 7, wherein the base is potassium hydroxide.

9. The process according to claim 7, wherein the amount of base is between 10 and 50 ppm based on the weight of the oil.

10. The process according to claim 1, wherein the temperature in step d) is from 210 to 255° C.

11. The process according to claim 1, wherein the stripping in step d) is performed using steam.

12. The process according to claim 1, wherein the deodorization in step d) is carried out at a reduced pressure of less than 10 mbar.

13. The process according to claim 1, wherein the bleaching in step e) is carried out at a temperature between 80 and 130° C., in the presence of 0.3-0.8% by weight of bleaching earth.

14. The process according to claim 1, wherein the deodorizing in step f) is carried out at a temperature of below 200° C.

15. The process according to claim 1, further comprising adding the fully refined vegetable oil to a food product.

* * * * *